United States Patent
Li et al.

(10) Patent No.: US 8,422,959 B2
(45) Date of Patent: Apr. 16, 2013

(54) COMPENSATING METHOD FOR CAPACITY OF RADIO FREQUENCY MODULE AND A RADIO FREQUENCY MODULE

(75) Inventors: Chengsheng Li, Shenzhen (CN); Yali Wang, Shenzhen (CN); Limeng Xiao, Shenzhen (CN)

(73) Assignee: Shenzhen Grentech Co. Ltd., Shenzhen (CN)

( * ) Notice: Subject to any disclaimer, the term of this patent is extended or adjusted under 35 U.S.C. 154(b) by 550 days.

(21) Appl. No.: 12/738,645

(22) PCT Filed: Jul. 1, 2008

(86) PCT No.: PCT/CN2008/071497
§ 371 (c)(1),
(2), (4) Date: Apr. 19, 2010

(87) PCT Pub. No.: WO2009/049507
PCT Pub. Date: Apr. 23, 2009

(65) Prior Publication Data
US 2010/0240325 A1    Sep. 23, 2010

(30) Foreign Application Priority Data
Oct. 19, 2007   (CN) .......................... 2007 1 0123969

(51) Int. Cl.
*H01Q 11/12*   (2006.01)
*H04B 1/04*   (2006.01)
*H04B 17/00*   (2006.01)
(52) U.S. Cl.
USPC ................. 455/67.11; 455/115.1; 455/127.2

(58) Field of Classification Search ................. 455/63.1, 455/67.11, 115.1, 226.1, 127.1, 127.2, 561, 455/296, 73; 375/296, 297
See application file for complete search history.

(56) References Cited

U.S. PATENT DOCUMENTS

| | | | | |
|---|---|---|---|---|
| 6,452,454 | B1 * | 9/2002 | Shapiro et al. ................ 330/289 |
| 6,507,732 | B1 * | 1/2003 | Dajer et al. ................ 455/277.2 |
| 7,133,644 | B2 * | 11/2006 | Demir et al. ................ 455/67.11 |
| 8,229,376 | B2 * | 7/2012 | Li et al. ...................... 455/127.2 |
| 2004/0142668 | A1 * | 7/2004 | Ge ............................. 455/127.1 |
| 2004/0148516 | A1 * | 7/2004 | Tohgi et al. .................. 713/200 |
| 2005/0101254 | A1 * | 5/2005 | Sasaki et al. ................ 455/63.1 |

* cited by examiner

Primary Examiner — Lewis West (57) ABSTRACT

A compensation method for radio frequency module performance, it is adding a module monitoring circuit and a radio frequency power detection circuit to an existing radio frequency module, meanwhile replacing an existing hardware compensation circuit with a radio frequency digital controlled attenuator. The method replaces hardware method by a method of combining software of the module monitoring circuit and hardware such as module monitoring circuit, radio frequency digital controlled attenuator and radio frequency power detection circuit, as well as intelligently compensates the radio frequency module by using data obtained by pre-defined table or formula/algorithm, so as to adjust each characteristic index of the device accurately and easily, thus to improve performance of the radio frequency module and further meet the requirement of working stability of the radio frequency module. The present invention further provides a radio frequency module improved by such method. As such radio frequency module can be automatically debugged and tested by tools such as computer, so production efficiency will be improved.

9 Claims, 5 Drawing Sheets

COMPENSATING METHOD FOR CAPACITY OF RADIO FREQUENCY MODULE AND A RADIO FREQUENCY MODULE

FIELD OF THE INVENTION

The present invention relates to performance optimization for a radio frequency module in a field of communication, more specifically, relates to a method for compensating gain of a radio frequency module and adjusting linearity of a radio frequency module, as well as the radio frequency module improved by such method.

BACKGROUND OF THE INVENTION

As an important component of a communication system, such as a base station and a repeater station, stability of a radio frequency module directly affects stability of the whole communication system. With the rapid development of communication industry, demand for such stability is increasing. Especially in 3G era, for pursuing higher data rate and spectrum efficiency, linear modulation methods (e.g. QPSK, 16QAM, etc.) are generally employed, and radio frequency modules with higher linearity reliability are needed by such modulation methods. The existing radio frequency modules have defects such as poor gain stability and linearity changeable with temperature due to various reasons.

Figure 1:
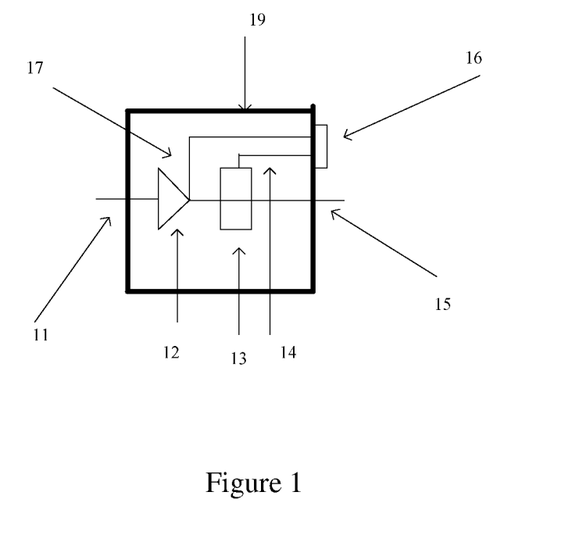
FIG. 1 is a structural diagram of currently existing radio frequency module.

FIG. 1 is a structural diagram of an existing radio frequency module. As shown in the figure, the radio frequency module comprises a signal input end 11, a power amplification circuit 12, a hardware compensation circuit 13, a monitoring signal line 14, a signal output end 15, a monitoring port 16, a monitoring signal line 17 and a radio frequency shielding housing 19.

Above mentioned existing radio frequency module has following defects:

1. Radio frequency module was designed according to a certain quota of gain and output power, when performance of the power amplifier declines, gain of the radio frequency module declines and output power of the radio frequency module becomes insufficient. Such phenomenon is one of the common problems in current communication devices. Such problem results in unrecoverable decline in performance index of the radio frequency module and the severe ones even result in abnormal operation of the whole communication equipment.

2. Hardware compensation circuit 13 of the radio frequency module uses hardware compensation, that is, uses temperature characteristics of the electronic components themselves for the compensation. Hardware compensation is mainly adjusting gate voltage of the power amplifier. The content of the compensation comprise gain and linearity of the radio frequency module. In practical operations, due to the differences in temperature characteristics among each power amplifiers, as well as differences in temperature characteristics within each electronic component itself, accuracy and reliability of compensated gain and linearity will be lower. Meanwhile, as the gain and linearity are realized by adjusting gate voltage of the power amplifier, in the case of being unable to take both into account, gain compensation and linearity compensation can not meet the need of the radio frequency module in certain extend. For example, gain and linearity compensation circuit in hardware compensation circuit 13 uses hardware compensation, when temperature characteristics of electronic components used in the hardware compensation can not perfectly match characteristics of the power amplifier needed to be compensated, phenomenon of gain and linearity compensation error will present at different temperatures.

3. Parts, in need of circuit compensation, of detection signal and control signal in power amplification circuit of the radio frequency module also commonly use hardware compensation method. For example, downlink output power detection of link in the radio frequency module uses commonly used radio frequency demodulation device, when demodulation curve of the frequency demodulation device differs from compensation curve of demodulation compensation device, phenomenon of inaccuracy downlink output power presents. In practical operations, demodulation curve of the frequency demodulation device often differs from compensation curve of demodulation compensation device, which results in that power detection accuracy for current radio frequency module is not very high with a general error of ±2 dB. When compensation curve seriously differs from demodulation curve, detected error even reaches up to ±5 dB.

4. As shown in FIG. 1, monitoring semaphore of current radio frequency module is directly connected out of control circuit/detection circuit of the module, and gathered to monitoring port 16. Since these monitoring signals are signals of TTL, CMOS or analog that easy to interfere with each other or be interfered by environment, thus influence the performance of radio frequency module.

From these defects existing in prior art, we can see that it is necessary to design a novel compensation method for radio frequency module performance, as well as corresponding radio frequency module, so as to improve accuracy, reliability and anti-interference ability of gain compensation.

SUMMARY OF THE INVENTION

The objective of this invention is to provide a compensation method for radio frequency module performance, and a radio frequency module improved by such method, so as to improve product performance of the radio frequency module, thereby increasing compensation accuracy in the radio frequency module, as well as adjusting linearity, reliability and anti-interference ability of the radio frequency module.

Technical solution employed in the present invention for solving above technical problems is: constructing a compensation method for radio frequency module performance, said radio frequency module is provided with a power amplification circuit, a radio frequency digital controlled attenuator, a radio frequency power detection circuit, and a module monitoring circuit, said method comprises:

S1: Said module monitoring circuit queries a predefined gain compensation table or calculates based on a predefined formula/algorithm according to the currently set frequency band and the collected temperature data to obtain a gain compensation data, which is sent to the radio frequency digital controlled attenuator, so as to adjust gain of the radio frequency module based on the said gain compensation data.

S2: Said module monitoring circuit queries a predefined linearity compensation table or calculates based on a predefined formula/algorithm according to the collected temperature data to obtain a linearity compensation data, which is sent to said power amplification circuit after being converted into corresponding control voltage by digital-analog conversion, so as to control linearity of said radio frequency module.

S3: Said module monitoring circuit queries a predefined power compensation table or calculates based on a predefined formula/algorithm according to the collected temperature data to obtain a power compensation value, which is added to currently detected power detection value, so as to obtain a corrected power detection value.

Furthermore, said step S1 further comprises:

S11: After said radio frequency module starts up, a pre-installed program in the processor of said module monitoring circuit runs all the initial values;

S12: Said module monitoring circuit queries the frequency band set in the program, the temperature sensor detects internal temperature of said radio frequency module in real-time and the processor obtains current temperature value;

S13: According to the queried frequency band and the obtained temperature value, queries the gain compensation table pre-saved in the program or calculates based on the formula/algorithm saved in the program, so as to obtain a corresponding compensation value;

S14: Outputs the obtained compensation value to the radio frequency digital controlled attenuator, and adjusts gain of said radio frequency module based on the compensation value;

Furthermore, said step S2 further comprises:

S21: After said radio frequency module starts up, a pre-installed program in the processor of said module monitoring circuit runs all the initial values;

S22: Said processor runs the program, the temperature sensor detects internal temperature of said radio frequency module in real-time and the processor obtains a current temperature value;

S23: According to the obtained temperature value, queries the linearity compensation table pre-saved in the program or calculates based on the formula/algorithm saved in the program, and obtains a corresponding compensation value;

S24: Outputs the obtained compensation value to the digital-analog convertor of the power amplification circuit, and converts the compensation value to a corresponding voltage value;

S25: Sends the obtained voltage value to the gate of the radio frequency power amplifier of said power amplification circuit, so as to adjust linearity of said radio frequency module.

Furthermore, said step S3 further comprises:

S31: After said radio frequency module starts up, a pre-installed program in the processor of said module monitoring circuit runs all the initial values;

S32: Said processor runs the program, the temperature sensor detects internal temperature of said radio frequency module in real-time and the processor obtains a current temperature value;

S33: According to the obtained temperature value, queries the power compensation table pre-saved in the program or calculates based on the formula/algorithm saved in the program, and obtains a corresponding power compensation value;

S34: Adds the obtained power compensation value to currently detected power detection value, so as to obtain a corrected power detection value.

Technical solution employed in the present invention for solving above technical problems is: constructing a radio frequency module, comprising a radio frequency shielding housing, wherein a power amplification circuit and a compensation circuit connected in series and in turn in a signal host link are arranged inside said radio frequency shielding housing, a monitoring port of said radio frequency module is arranged outside said radio frequency shielding housing. According to the present invention, said compensation circuit comprises a radio frequency digital controlled attenuator. A module monitoring circuit, as well as a radio frequency power detection circuit connected in series and in turn with said power amplification circuit and radio frequency digital controlled attenuator on the signal host link is also arranged inside said radio frequency shielding housing, said module monitoring circuit is connected with the power amplification circuit, the radio frequency digital controlled attenuator and the radio frequency power detection circuit respectively through monitoring signal lines, the module monitoring circuit is also connected with the monitoring port through a RS-485 bus.

Furthermore, said module monitoring circuit comprises a processor, a crystal oscillator, a RS-485 convertor, a third analog-digital convertor and a temperature sensor, wherein said crystal oscillator is connected with the reference clock pin of the processor, said RS-485 convertor is connected with the receiving/transmitting signal line of the processor, the output part of the third analog-digital convertor is connected with the processor, and the input part of the third analog-digital convertor is connected with the temperature sensor.

Furthermore, said radio frequency power detection circuit further comprises a second directional coupler, a demodulation device, a second isolator and a second analog-digital convertor. The main signal input end of the second directional coupler is connected to the radio frequency digital controlled attenuator, the main signal output end of the second directional coupler is connected to the output end of the radio frequency module, a certain proportion of radio frequency signal is coupled from the main signal link by the second directional coupler, the coupled signal end of the second directional coupler is connected to the input end of the demodulation device, the output end of the demodulation device is connected to the input end of the second analog-digital convertor through the second isolator, the output end of the second analog-digital convertor is connected to the processor.

Furthermore, the control part of said radio frequency digital controlled attenuator is connected to the processor of the module monitoring circuit, the signal input end of the radio frequency digital controlled attenuator is connected to the output end of the power amplification circuit, and the signal output end of the radio frequency digital controlled attenuator is connected to the radio frequency power detection circuit.

Furthermore, the monitoring port of said radio frequency module comprises a data connector for connecting monitoring signal of the module monitoring circuit to peripheral control device of said radio frequency module, and said data connector is connected with the RS-485 bus outputted from the module monitoring circuit.

The compensation method for radio frequency module performance and the radio frequency module provided by the present invention mainly employ a software/hardware combination method of controllable software/hardware compensation circuit and module monitoring circuit for replacing a pure hardware controlled compensation circuit, thus increasing compensation precision and accuracy of the radio frequency module. Meanwhile, output method of RS-485 bus is employed; thereby interference among signals is eliminated due to the differential level mode employed by RS-485 bus. Moreover, module semaphore is transformed into data quantity for transmission, thus avoiding induction of outside interference signals and increasing reliability and anti-interference ability of the radio frequency module. Furthermore, as the radio frequency module employs monitoring method with above mentioned structure, tools such as computer and so on can be employed for automatically debugging and testing, thereby raising production efficiency.

BRIEF DESCRIPTION OF THE DRAWINGS

The present invention will be further described with reference to the drawings and embodiments, in the drawings.

DETAILED DESCRIPTION OF THE PREFERRED EMBODIMENT

The objective of the present invention is to provide a compensation method for radio frequency module performance, and an improved radio frequency module obtained by such method. Details of the present invention will be described with reference to the embodiments and drawings.

Figure 2:
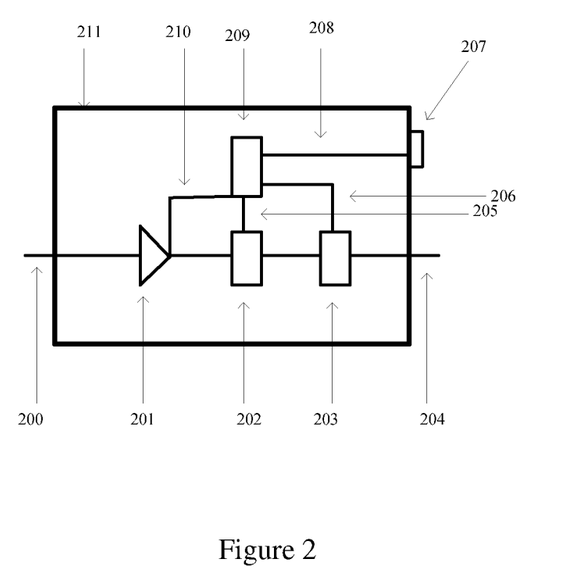
FIG. 2 is a structural diagram of radio frequency module according to the present invention.

FIG. 2 is a structural diagram of a radio frequency module improved by the present invention. As shown in FIG. 2, the shown radio frequency module comprises a radio frequency shielding housing 211. A monitoring port 207 of the radio frequency module is arranged outside the housing body of the radio frequency shielding housing 211. Inside the housing body of the radio frequency shielding housing 211, a power amplification circuit 201, a radio frequency digital controlled attenuator 202 and a radio frequency power detection circuit 203 connected in series in turn in signal host link are arranged. A module monitoring circuit 209 is also arranged inside the housing body of the radio frequency shielding housing 211. Monitoring signal line 210, monitoring signal line 205 and monitoring signal line 206 are connected between the power amplification circuit 201 and the module monitoring circuit 209, between the module monitoring circuit 209 and the radio frequency digital controlled attenuator 202, and between the module monitoring circuit 209 and the radio frequency power detection circuit 203 respectively. The module monitoring circuit 209 is connected to the monitoring port 207 through RS-485 bus 208. In module structure according to the present invention, signal of the radio frequency module is input through signal input end 200 and then output to corresponding link through signal output end 204. The radio frequency digital controlled attenuator 202 plays a role of gain attenuation in the radio frequency module (e.g. for a power amplifier module with gain of 40 dB, when it has 1 dB attenuation on the link, its gain is just 39 dB), and mainly plays a role of controlling gain of the radio frequency module herein.

Figure 3:
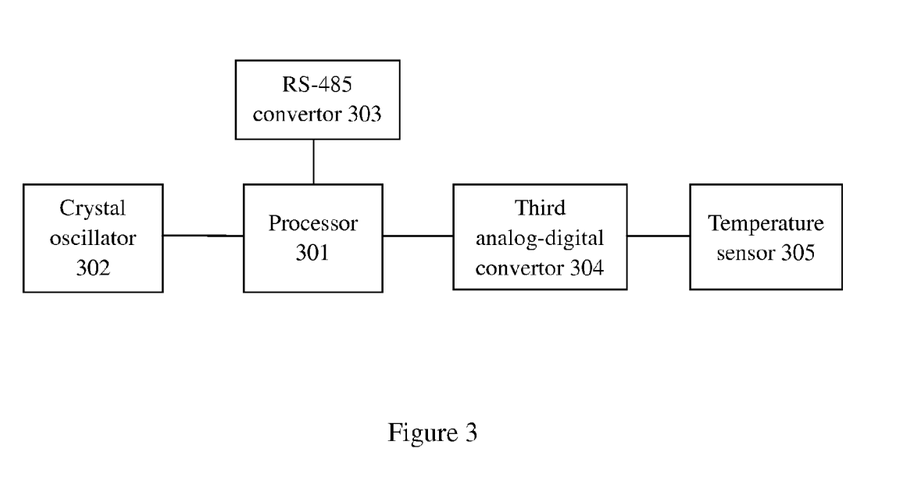
FIG. 3 is a structural diagram of module monitoring circuit of radio frequency module according to the present invention.

As shown in FIG. 3, illustrated module monitoring circuit 209 comprises a processor (i.e. CPU) 301, a crystal oscillator 302, a RS-485 convertor 303, a third analog-digital convertor 304 and a temperature sensor 305, wherein the crystal oscillator 302 is connected to the reference clock pin of the processor 301, the RS-485 convertor 303 is connected to the signal receiving/transmitting signal line of the processor 301, output part of the third analog-digital convertor 304 is connected to the processor 301, and input part of the third analog-digital convertor 304 is connected to the temperature sensor 305. The processor 301 of the module monitoring circuit 209 is connected to the temperature sensor 305, when the temperature sensor 305 works, detected internal temperature of the radio frequency module is converted to voltage value, which is sent to the third analog-digital convertor 304. After an analog-digital conversion, the voltage value is transformed to data which is sent to the processor 301 then, thus procedure of temperature collection is accomplished. According to the present invention, said processor 201 comprises components that being able to accomplish data processing (the MCU, DSP, EPGA, etc.). This embodiment takes the MCU for example.

Figure 4:
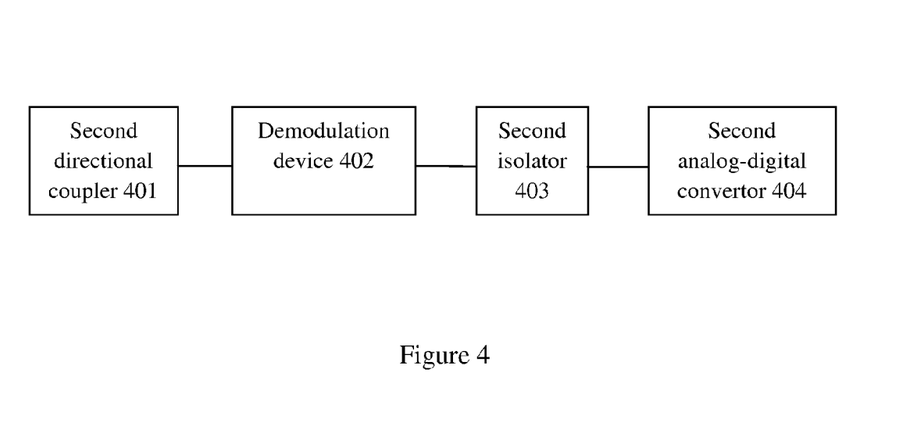
FIG. 4 is a structural diagram of radio frequency power detection circuit of radio frequency module according to the present invention.

As shown in FIG. 4, illustrated radio frequency power detection circuit 203 comprises a second directional coupler 401, a demodulation device 402, a second isolator 403 and a second analog-digital convertor 404. Main signal input end of the second directional coupler 401 is connected to the radio frequency digital controlled attenuator 202, main signal output end of the second directional coupler 401 is connected to the output end of the radio frequency module, a certain proportion of radio frequency signal is coupled from the main signal link by the second directional coupler 402. The coupled signal end of the second directional coupler 401 is connected to the input end of the demodulation device 402, output end of the demodulation device 402 is connected to the input end of the second analog-digital convertor 404 through the second isolator 403, output end of the second analog-digital convertor 404 is connected to the processor 301.

Furthermore, control part of the radio frequency digital controlled attenuator 202 is connected to the process 301 of the module monitoring circuit 209, signal input end of the radio frequency digital controlled attenuator 202 is connected to the output end of the power amplification circuit 201, and signal output end of the radio frequency digital controlled attenuator 202 is connected to the radio frequency power detection circuit 203. Monitoring port 207 of said radio frequency module comprises a data connector for connecting a monitoring signal of the module monitoring circuit 209 to peripheral control device of said radio frequency module, and said data connector is connected to the RS-485 bus output from the module monitoring circuit 209.

Figure 5:
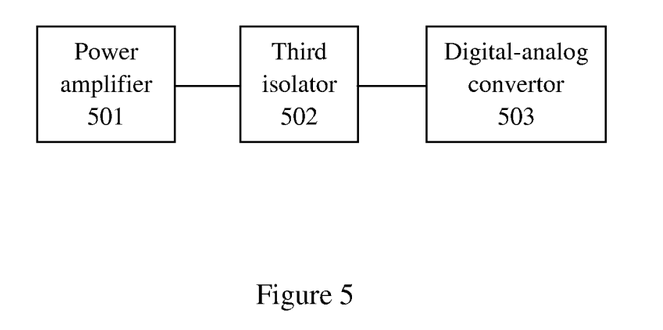
FIG. 5 is a structural diagram of power amplification circuit of radio frequency module according to the present invention.

As shown in FIG. 5, the power amplification circuit 201 comprises a power amplifier 501, a third isolator 502 and a digital-analog convertor 503. The input end of the power amplifier 501 is connected to the signal output end 200 of said radio frequency module, the output end of the power amplifier 501 is connected to the input end of the radio frequency digital controlled attenuator 202, the gate of the power amplifier 501 is connected to the output part of the digital-analog convertor 503 through the third isolator 502, the input part of the digital-analog convertor 503 is connected to the processor 301 of the module monitoring circuit 209. The digital-analog convertor 503 receives data from a data bus connected to the processor 301 and converts such data into a certain proportion of voltage value, which is used to control gate voltage of the power amplifier 501 in the power amplification circuit 201 via a radio frequency circuit isolator.

When the radio frequency works, the temperature sensor 305 of the module monitoring circuit 209 collects internal temperature of the radio frequency module in real-time, and sends the collected temperature data to the MCU 301. Soft program in the MCU 201 runs to query the linearity compensation table saved in the program or to calculate based on the predefined formula/algorithm according to the collected current temperature data, and sends the compensation data obtained by querying or calculating to the data bus of the MCU 301. The digital-analog convertor 503 receives compensation data from a data bus connected to the MCU 301, and converts the compensation data into a certain proportion of voltage value, which is used to control gate voltage of the power amplifier 501 in the power amplification circuit 201 through the third isolator 502, and then plays a role of controlling linearity of the power amplifier 501, thereby achieving linearity adjusting of the radio frequency module, as well as reduce the influence of ambient temperature to linearity of the radio frequency module. Meanwhile, when detecting radio frequency power, the soft program in the MCU 301 runs to query the power compensation table saved in the program or to calculate based on the predefined formula/algorithm according to the collected current temperature data, and corrects detected radio frequency power value by using power compensation data obtained by querying or calculating, thus reducing the influence of ambient temperature to detection accuracy of the radio frequency module power. Moreover, the soft program in the MCU 301 will query the gain compensation table saved in the program or calculate based on the predefined formula/algorithm according to the current set frequency band and the collected current temperature, and sends the compensation data obtained by querying or calculating to the radio frequency digital controlled attenuator 202 to achieve gain control of the whole radio frequency module, thus reducing the influence of ambient temperature to detection accuracy of the radio frequency module power.

The largest gain of the radio frequency module according to the present invention is larger than the rated gain, and the extra part is adjusted by the radio frequency digital controlled attenuator 104 according to the requirement. The term "requirement" herein refers to that the module monitoring circuit 111 will determine by comparing difference value between the radio frequency output power and the radio frequency input power detected by the radio frequency input power detection circuit 101 and the radio frequency output power detection circuit 105 with a predefined nominal value. When the actual difference value between the radio frequency output power and the radio frequency input power is larger than the nominal value, the radio frequency digital controlled attenuator 104 increases attenuation until the difference value is equal to the nominal value; contrarily, when the actual difference value between the radio frequency output power and the radio frequency input power is smaller than the nominal value, the radio frequency digital controlled attenuator 104 decreases attenuation until the difference value is equal to the nominal value.

The radio frequency module provided by the present invention mainly employs a software/hardware combination method of controllable software/hardware compensation circuit and module monitoring circuit for replacing a pure hardware controlled compensation circuit, thus increasing compensation precision and accuracy of the radio frequency module. Meanwhile, output method of RS-485 bus is employed; thereby interference among signals is eliminated due to the differential level mode employed by RS-485 bus. Moreover, module semaphore is transformed into data quantity for the transmission, thus avoiding introduction of outside interference signals and increasing reliability and anti-interference ability of the radio frequency module. Furthermore, as the radio frequency module employs monitoring method with above mentioned structure, tools such as computer and so on can be employed for automatically debugging and testing, thereby raising production efficiency.

The present invention further provides a compensation method for radio frequency module performance. FIG. 2 shows the improved radio frequency module, the radio frequency module of the present invention is provided with a power amplification circuit 201, a radio frequency digital controlled attenuator 202, a radio frequency power detection circuit 203 and a module monitoring circuit 209. The present invention uses a software/hardware combination compensation method and replaces conventional hardware compensation circuit with the radio frequency digital controlled attenuator 202.

Wherein soft program running in the processor of the module monitoring circuit 209 queries the predefined power compensation table or calculates based on the predefined formula/algorithm according to collected temperature data to obtain a power compensation value, which is used to correct the detected radio frequency power value, thus reducing influence of ambient temperature to power detection accuracy of the radio frequency module. However, when the radio frequency signals with same size are detected under different temperatures, the detected results may be different from the actual value. Therefore, it is necessary to check the detected results with the actual value and make a table of compensation values at each temperature. This way, compensation value corresponding to currently detected temperature can be queried and then be directly added to the detected result. When power value of the radio frequency is read, the read value will directly be a corrected result.

Meanwhile, soft program running in the processor 301 of the module monitoring circuit 209 queries the predefined gain compensation table or calculates based on the predefined formula/algorithm according to the frequency band set by the current program and the collected current ambient temperature to obtain a compensation value, which is sent to the radio frequency digital controlled attenuator 302 through a monitoring signal line 305. The radio frequency digital controlled attenuator 302 plays a role of attenuating signal intensity in the host link, so as to reduce influence of ambient temperature to gain of the radio frequency module. Herein, the radio frequency digital controlled attenuator 302 plays a role of gain attenuation, for example, for a power amplifier module with gain of 40 dB, when it has 1 dB attenuation on the link, its gain is just 39 dB. Meanwhile, soft program running in the processor 301 of the module monitoring circuit 209 queries the predefined power compensation table or calculates based on the predefined formula/algorithm according to collected temperature data to obtain a compensation value, which is used to adjust voltage value of the third analog-digital convertor 304, thus adjusting linearity of the radio frequency module and reducing influence of ambient temperature to linearity of the radio frequency module. Wherein linearity corresponding to each temperature value may be different from each other, accordingly the device should be tested under a certain condition. Above-mentioned the power compensation table is linearity needed to be detected through actual temperature, and adjustment of linearity is achieved by controlling gate voltage of power amplification tube of the power amplifier in the power amplification circuit 201. Moreover, said formula/algorithm actually refers to a formula or an algorithm being able to realize functions of the above-mentioned table. Actually same function has been realized by the formula/algorithm and the above-mentioned table, that is, correspond each temperature to one linearity.

According to the present invention, said processor (i.e. MCU) 301 further comprises components that being able to achieve data processing, such as MCU, DSP, FPGA etc. The present invention takes MCU for example. The linearity compensation table and the power compensation table predefined in the program are discrete tables formed by emulating or actually measuring and calculating according to theoretical temperature characteristic curves of components such as the power amplifier of the power amplification circuit 201, the radio frequency demodulation tube of the radio frequency power detection circuit etc. The linearity compensation formula/algorithm and the power compensation table formula/algorithm used in the program are concluded by emulating or actually measuring and calculating according to theoretical temperature characteristic curves of components such as the power amplifier of the power amplification circuit 201, the radio frequency demodulation tube of radio frequency power detection circuit etc.

Figure 6:
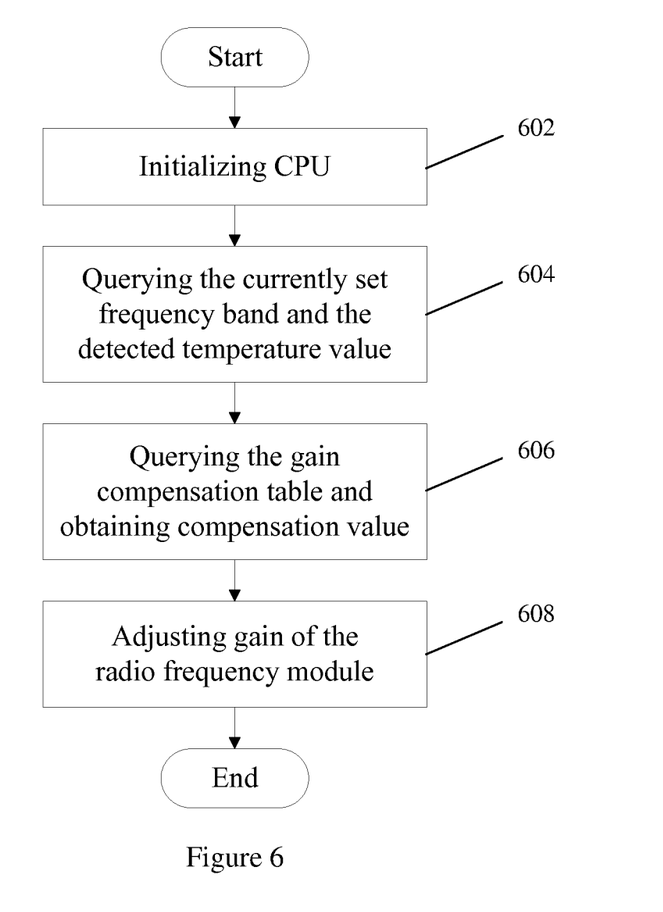
FIG. 6 is a method flow chart of querying the gain compensation table in the compensation method according to the present invention.

FIG. 6 is a method flow chart of querying the gain compensation table in the compensation method according to the present invention. In the step 602, after the radio frequency module starts up, pre-installed program in the process 301 of said module monitoring circuit 209 runs all the initial values. In the step 604, the module monitoring circuit 209 queries frequency band set in the program, and the temperature sensor 305 detects internal temperature of the radio frequency module in real-time and obtains current temperature value. In the step 606, according to the queried frequency band value and the obtained temperature value, queries the gain compensation table pre-saved in the program or calculates based on the formula/algorithm saved in the program, and then obtains a corresponding compensation value. In the step 608, obtained compensation value is outputted to the radio frequency digital controlled attenuator 202, so as to adjust gain of the radio frequency module based on such compensation value.

Figure 7:
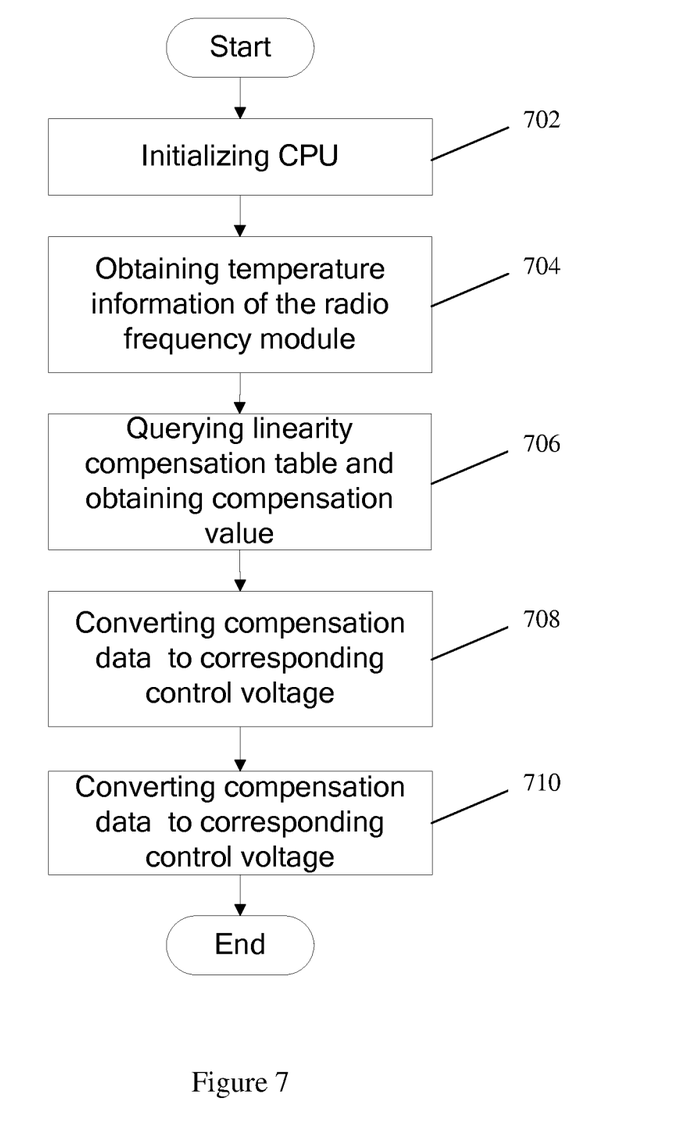
FIG. 7 is a method flow chart of querying the linearity compensation table in the compensation method according to the present invention.
Figure 8:
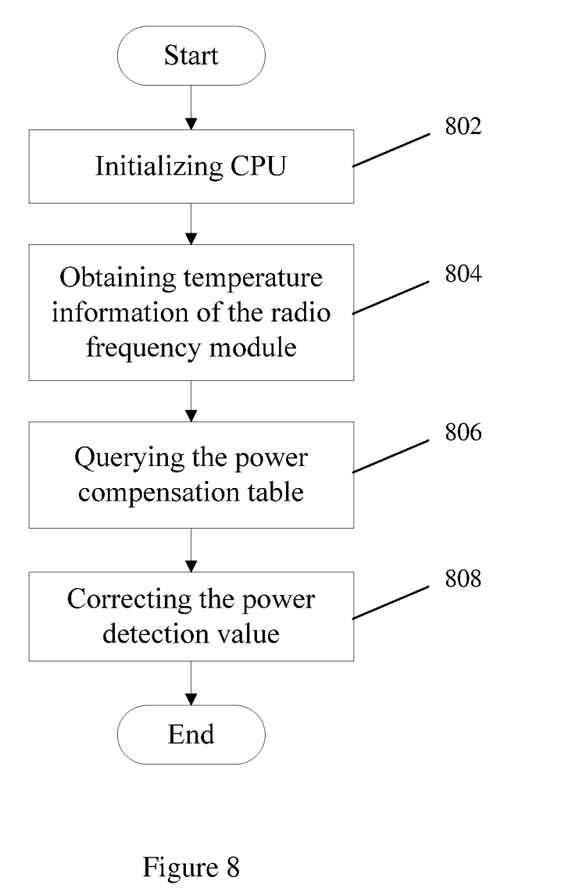
FIG. 8 is a method flow chart of correcting power detection value in the compensation method according to the present invention.

FIG. 7 is a method flow chart of querying the linearity compensation table in the compensation method according to the present invention. In the step 702, when the radio frequency module starts up, pre-installed program in the processor 301 of the module monitoring circuit 209 runs all the initial values. Wherein initial values mainly comprises necessary data while the program runs, loading rated gain value of the radio frequency module, linearity compensation value, power detection corrected value etc. In the step 704, the processor 301 runs the program, the temperature sensor 305 detects internal temperature of the radio frequency module in real-time to obtain a current temperature value. In the step 706, corresponding corrected value is obtained by querying the linearity compensation table pre-saved in the program or calculating based on the formula/algorithm saved in the program according to the temperature value obtained in the step 305. In the step 708, the obtained compensation value is outputted to the third analog-digital convertor 304 and is converted into a corresponding voltage value. In the step 710, the voltage value obtained in the step 708 is sent to the gate of the radio frequency power amplifier of the power amplification circuit 201, so as to adjust linearity of the radio frequency module. FIG. 8 is a method flow chart of querying the power detection compensation table in the compensation method according to the present invention. In the step 802, when the radio frequency module starts up, pre-installed program in the process 301 of the module monitoring circuit 209 runs all the initial values. In the step 804, the processor 301 runs the program, the temperature sensor 305 detects internal temperature of the radio frequency module in real-time and obtains a current temperature value. In the step 806, corresponding power compensation value is obtained by querying the power compensation table pre-saved in the program or calculating based on the formula/algorithm saved in the program according to the temperature value obtained in the step 804. In the step 808, the obtained power compensation value is added to the currently detected power detection value, so as to obtain a corrected power detection value.

The compensation method for radio frequency module performance provided by the present invention employs a software/hardware combination method for replacing a pure hardware method, and intelligently compensates the radio frequency module using the data obtained by predefined compensation table or formula/algorithm, thus being able to adjust each characteristic of the device accurately and easily, so as to improve performance of the radio frequency module and further meet the need of working stability of the radio frequency module. By employing a software/hardware combination method of controllable software/hardware compensation circuit and module monitoring circuit for replacing a pure hardware controlled compensation circuit in prior art, the precision and accuracy of compensation for the radio frequency module is improved, and the precision can be controlled within ±1.0 dB and even smaller. Moreover, since the radio frequency module is able to be automatically debugged and tested by tools such as computer, production efficiency will be improved.

The foregoing description are just preferred embodiments for methods and devices according to the present invention and are described specifically and in detail, but cannot be understood as limitation to scope of the present invention. It should be indicated that one skilled in the art can make various modifications and equivalent variations to embodiments according to content disclosed above within scope of the present invention and without departing from spirit of the present invention, all these modifications and equivalent transformations are part of protection range of the present invention.

We claim:

1. A compensation method for radio frequency module performance, wherein said radio frequency module is provided with a power amplification circuit (201), a radio frequency digital controlled attenuator (202), a radio frequency power detection circuit (203) and a module monitoring circuit (209), said method comprises:
   S1: Said module monitoring circuit (209) queries a predefined gain compensation table or calculates based on a predefined formula/algorithm according to the currently set frequency band and the collected temperature data to obtain a gain compensation data, which is sent to the radio frequency digital controlled attenuator (202), so as to adjust gain of the radio frequency module based on the said gain compensation data;
   S2: Said module monitoring circuit (209) queries a predefined linearity compensation table or calculates based on a predefined formula/algorithm according to the collected temperature data to obtain a linearity compensation data, which is sent to said power amplification circuit (201) after being converted into corresponding control voltage by digital-analog conversion, so as to control linearity of said radio frequency module;
   S3: Said module monitoring circuit (209) queries a predefined power compensation table or calculates based on a predefined formula/algorithm according to the collected temperature data to obtain a power compensation value, which is added to currently detected power detection value, so as to obtain a corrected power detection value.

2. The compensation method for radio frequency module performance according to claim 1, wherein said step S1 further comprises:

S11: After said radio frequency module starts up, a pre-installed program in the processor (301) of said module monitoring circuit (209) runs all the initial values;

S12: Said module monitoring circuit (209) queries the frequency band set in the program, the temperature sensor (305) detects internal temperature of said radio frequency module in real-time and the processor (301) obtains current temperature value;

S13: According to the queried frequency band value and the obtained temperature value, queries the gain compensation table pre-saved in the program or calculates based on the formula/algorithm saved in the program, so as to obtain a corresponding compensation value;

S14: Outputs the obtained compensation value to the radio frequency digital controlled attenuator (202), and adjusts gain of said radio frequency module based on the compensation value.

3. The compensation method for radio frequency module performance according to claim 1, wherein said step S2 further comprises:

S21: After said radio frequency module starts up, a pre-installed program in the processor (301) of said module monitoring circuit (209) runs all the initial values;

S22: Said processor (301) runs the program, the temperature sensor (305) detects internal temperature of said radio frequency module in real-time and the processor (301) obtains a current temperature value;

S23: According to the obtained temperature value, queries the linearity compensation table pre-saved in the program or calculates based on the formula/algorithm saved in the program, and obtains a corresponding compensation value;

S24: Outputs the obtained compensation value to the digital-analog convertor (503) of the power amplification circuit (201), and converts the compensation value to a corresponding voltage value;

S25: Sends the obtained voltage value to the gate of the radio frequency power amplifier (501) of said power amplification circuit (201), so as to adjust linearity of said radio frequency module.

4. The compensation method for radio frequency module performance according to claim 1, wherein said step S3 further comprises:

S31: After said radio frequency module starts up, a pre-installed program in the processor (301) of said module monitoring circuit runs all the initial values;

S32: Said processor (301) runs the program, the temperature sensor (305) detects internal temperature of said radio frequency module in real-time and the processor (301) obtains a current temperature value;

S33: According to the obtained temperature value, queries the power compensation table pre-saved in the program or calculates based on the formula/algorithm saved in the program, and obtains a corresponding power compensation value;

S34: Adds the obtained power compensation value to currently detected power detection value, so as to obtain a corrected power detection value.

5. A radio frequency module, comprising a radio frequency shielding housing (211), wherein a power amplification circuit (201) and a compensation circuit connected in series and in turn in signal host link are arranged inside said radio frequency shielding housing (211), a monitoring port (207) of said radio frequency module is arranged outside said radio frequency shielding housing (211), wherein said compensation circuit comprises a radio frequency digital controlled attenuator (202); a module monitoring circuit (209), as well as a radio frequency power detection circuit (203) connected in series and in turn with said power amplification circuit (201) and radio frequency digital controlled attenuator (202) in signal host link is also arranged inside said radio frequency shielding housing (211); said module monitoring circuit (209) is connected to the power amplification circuit (201), the radio frequency digital controlled attenuator (202) and the radio frequency power detection circuit (203) respectively through monitoring signal lines; the module monitoring circuit (209) also is connected to the monitoring port (207) through the RS-485 bus.

6. The radio frequency module according to claim 5, wherein said module monitoring circuit (209) comprises a processor (301), a crystal oscillator (302), a RS-485 convertor (303), a third analog-digital convertor (304) and a temperature sensor (305), wherein said crystal oscillator (302) is connected to the reference clock pin of the processor (301), said RS-485 convertor (303) is connected to the receiving/transmitting signal line of the processor (301), the output part of the third analog-digital convertor (304) is connected to the processor (301), and the input part of the third analog-digital convertor (304) is connected to the temperature sensor (305).

7. The radio frequency module according to claim 6, wherein said radio frequency power detection circuit (203) comprises a second directional coupler (401), a demodulation device (402), a second isolator (403) and a second analog-digital convertor (404), the main signal input end of the second directional coupler (401) is connected to the radio frequency digital controlled attenuator (202), the main signal output end of the second directional coupler (401) is connected to the output end of the radio frequency module, a certain proportion of radio frequency signal is coupled from the main signal link by the second directional coupler, the coupled signal end of the second directional coupler (401) is connected to the input end of the demodulation device (402), the output end of the demodulation device (402) is connected to the input end of the second analog-digital convertor (404) through the second isolator (403), the output end of the second analog-digital convertor (404) is connected to the processor (301).

8. The radio frequency module according to claim 7, wherein the control part of said radio frequency digital controlled attenuator (202) is connected to the processor (301) of the module monitoring circuit (209), the signal input end of the radio frequency digital controlled attenuator (202) is connected to the output end of the power amplification circuit (201), and the signal output end of the radio frequency digital controlled attenuator (202) is connected to the radio frequency power detection circuit (203).

9. The radio frequency module according to claim 5, wherein the monitoring port (207) of said radio frequency module comprises a data connector for connecting monitoring signal of the module monitoring circuit (209) to peripheral control device of said radio frequency module, and said data connector is connected to the RS-485 bus outputted from the module monitoring circuit (209).

* * * * *